Oct. 21, 1969  J. C. HASTINGS  3,474,237

STRAIN GAGE ROSETTE CALCULATOR

Filed Oct. 3, 1966

INVENTOR.
JOSEPH C. HASTINGS
BY
Edward M. Farrell
ATTORNEY

United States Patent Office 3,474,237
Patented Oct. 21, 1969

3,474,237
STRAIN GAGE ROSETTE CALCULATOR
Joseph C. Hastings, Haverford, Pa., assignor, by mesne assignments, to Automation Industries, Inc., a corporation of California
Filed Oct. 3, 1966, Ser. No. 583,840
Int. Cl. G06f 15/20; G06g 7/48
U.S. Cl. 235—151.3
17 Claims

ABSTRACT OF THE DISCLOSURE

The rosette calculator is described which comprises three angularly disposed strain gages on the surface of the material under test. Strain values taken therefrom are entered into the calculator numerically yielding electrical signals which are then selectively combined. These combined signals are then subjected to variations in accordance with sine and cosine functions. The varied signals are further combined in a manner to produce a plurality of output signals representing maximum, minimum and shear strains within the material under test. Similar output signals representing maximum, minimum and shear stresses are obtainable by varying the electrical signals at different points in accordance with Poisson's ratio, and the elastic factor in the material under test.

BACKGROUND OF THE INVENTION

Field of the invention

This invention relates to strain gage rosette calculators, and more particularly, to electronic means for converting data representing data from a plurality of strain gages into information data representing unknown conditions of a material under test, such as strains and stresses.

Description of the prior art

The use of strain gages to produce electrical signals representing strains within a material being tested is well known. The signals from strain gages may be used to determine certain characteristics which are difficult or incapable of being measured directly. Such characteristics for example, may be maximum, minimum and shear stress measurements, as well as maximum and minimum strains and the directions of such strains and stresses.

If a number of strain gages, for example three, are disposed on a plane surface at predetermined angles, then a number of different types of measurements relating to strains and stresses may be computed. A strain gage rosette is one of several specific physical groupings of three or four strain gages disposed at predetermined angles so that various data relating to unknown strain and stress fields can be computed. This data may include the angles of principal stress and strain, maximum and minimum stresses and strains, and shear stresses and strains.

As is well known, the strain gage rosette is an extremely useful tool in stress analysis. However, heretofore the use of such strain gage rosettes has generally required lengthy and tedious methodical data reduction to yield the desired results. One reason for this has been that the formulas derived from measurements have been very complex and not capable of being solved rapidly.

SUMMARY OF THE INVENTION

In accordance with the present invention, a small, compact electronically operated rosette calculator is provided. Strain values are taken from three strain gages angularly disposed on a surface of a material under test. These strain values are entered into the calculator numerically yielding electrical signals which are then selectively combined in an additive or subtractive manner. The combined signals are then subjected to variations in accordance with sine and cosine functions. The varied signals are further combined in an additive or subtractive manner to produce a plurality of output signals representing maximum, minimum and shear strains within the material under test. Similar output signals representing maximum, minimum and shear stresses are obtainable by varying the electrical signals at different points in accordance with Poisson's ratio and the elasticity factor of the material under test.

BRIEF DESCRIPTION OF THE DRAWINGS

These and other features and advantages of the present invention will be apparent and suggest themselves to those skilled in the field to which the present invention is related, from a reading of the following specification and claims in conjunction with the accompanying drawing, in which:

FIG. 1b illustrates Mohr's circle as related to a specific set of measurements from the strain gages of FIG. 1a;

DESCRIPTION OF ONE PREFERRED EMBODIMENT

As mentioned, one of the problems associated with prior art rosette calculators is that the readings therefrom became parts of complex formulas which had to be solved before the data desired could be obtained. While computer devices may be used for quick solutions, such devices are costly. One of the features of the subject invention involves the simplification of measurements and including them in relatively simple formulas which can be readily solved by conventional electrical analog components thereby making it possible for the entire calculator to be included in a desk top unit.

For purposes of explanation and illustrating the utility of the subject inventions, the prior art as related to Mohr's circle and the complexity of the formulas derived from Mohr's circle will be discussed briefly. The means for utilizing the basic theory surrounding Mohr's circle to arrive at formulas capable of being used quickly and efficiently in relatively simple elements will also be discussed. It will then be seen that the same results are attained by the subject invention as were attainable by the use of complex and costly devices of the prior art.

Figure 1A:
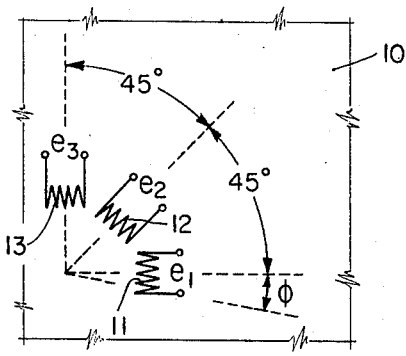
FIG. 1a represents three strain gages angularly disposed on a surface at approximately forty-five degrees with respect to each other.

It is noted that the strain gages 11, 12 and 13 of FIG. 1a are disposed at 45 degree angles with respect to each other. In connection with Mohr's circle, the values of the angle will be double that illustrated. For example, a 45 degree angle between the gages will be illustrated as being 90 degrees when represented by Mohr's circle. This factor is considered in the various operations involved in the subject invention.

Figure 1B:
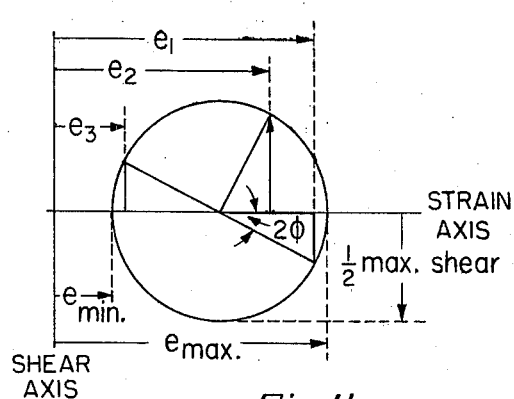

Referring particularly to FIGS. 1a and 1b, strain gages 11, 12 and 13 are angularly disposed on a surface 10 of an element under test. The magnitudes of the three measured strains $e_1$, $e_2$ and $e_3$ from strain gages 11, 12 and 13, respectively, are plotted along the abcissa of a graph with due regard to algebraic sign. The circle is then drawn. The center is placed at the midpoint between $e_1$ and $e_3$ along the abscissa and the diameter is developed as a function of $e_2$, as well as $e_1$ and $e_3$. Correctly chosen, the projections of $e_1$, $e_2$ and $e_3$ which are drawn as radii displaced about the center at twice the angle as the original physical arrangement of the gages, onto the circle will determine three radii of the circle, the two radii from the projection of $e_1$ and $e_3$ will be a diameter and the radius from the projection of $e_2$ will be perpendicular to the diameter mentioned. Once the Mohr's circle has been constructed, the maximum and minimum principal strains and the maximum shear strain have been determined, as noted on the illustrative plot.

The desired stress figures can now be obtained from the previously obtained strain results by simple algebraic equations using Poisson's ratio ($u$) and the modulus of elasticity (E) of the material under study.

The proposed invention deals with a practical electrical method of solving the Mohr's circle construction and thus solving all desired limits of stress and strain. As mentioned, while this could be done by complex digital techniques the present invention relates to an analog method for solution.

The use of rosette calculators in connection with Mohr's circle is described in Chapter 7 of "The Strain Gage Primer" by C. C. Perry and H. R. Listner, published by McGraw Hill Book Company and copyrighted in 1955. Some of the complex formulas referred to are included in this chapter.

Figure 2A:
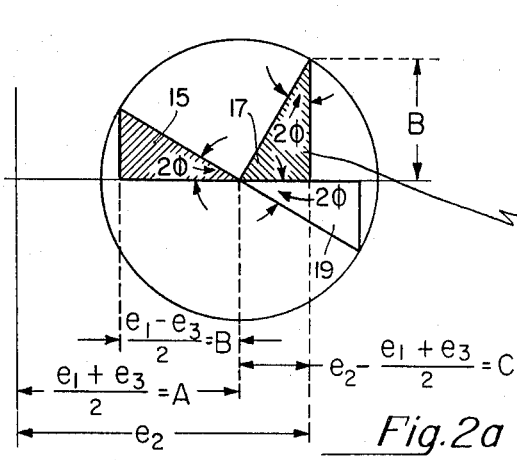
FIG. 2a represents a circle similar to that of FIG. 1b, specifically reproduced to show the relationship between the various functions related to the present invention and its relationship to Mohr's circle.
Figure 2B:
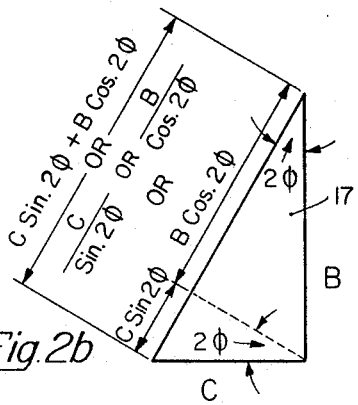
FIG. 2b represents a portion of FIG. 2a shown for purposes of explanation in connection with the present invention.

FIG. 2a is substantially the same as FIG. 1b. FIG. 2b represents an enlarged portion of FIG. 2a. For purposes of explanation, triangles 15, 17 and 19 are referred to. It may be seen that triangles 15 and 17 are congruent triangles.

FIG. 2b illustrates the triangle 17 taken from FIG. 2a in an enlarged view. The various algebraic relationships between the angles and the sides are illustrated. These relationships are arrived at by the application of simple trigonometrical formulas involving sine and cosine funtions, well known to those skilled in the art. The various functions associated with the triangle 17 involving relatively simple terms are related to other parts of the circle of FIG. 2a, which corresponds to Mohr's circle. These terms are utilized to derive formulas adapted for use in the device embodying the subject invention.

From FIGS. 2a and 2b various relationships may be seen as follows:

$$e \max = A + (C \sin 2\phi + B \cos 2\phi)$$
$$E \min = A - (C \sin 2\phi + B \cos 2\phi)$$
$$\gamma \max = 2 (C \sin 2\phi + B \cos 2\phi)$$

To determine the angle $\phi$, $$\frac{C}{\sin 2\phi} = \frac{B}{\cos 2\phi}$$

or $$B \sin 2\phi - C \cos 2\phi = 0$$

where $e$ is equal to strain and $\gamma$ is equal to shear.

The equations above can be solved by an analog computer of the type embodied in the subject invention using operational amplifiers to perform the addition, subtraction and fixed multiplication, and a dual sine-cosine potentiometer to solve the angular functions. This is possible because the formulas do not include complex terms including squares, square roots or other such functions.

In discussing the various analog devices of FIG. 3, references will be made to positive and negative signs. The positive and negative signs are intended to show how the various analog devices handle the applied signals, i.e. a plus sign indicates that the analog device will handle the signal in an additive fashion and the negative sign indicates that the analog device will handle the signal in a substractive manner. The signs are not intended to necessarily illustrate the actual polarities of the signals.

Figure 3:
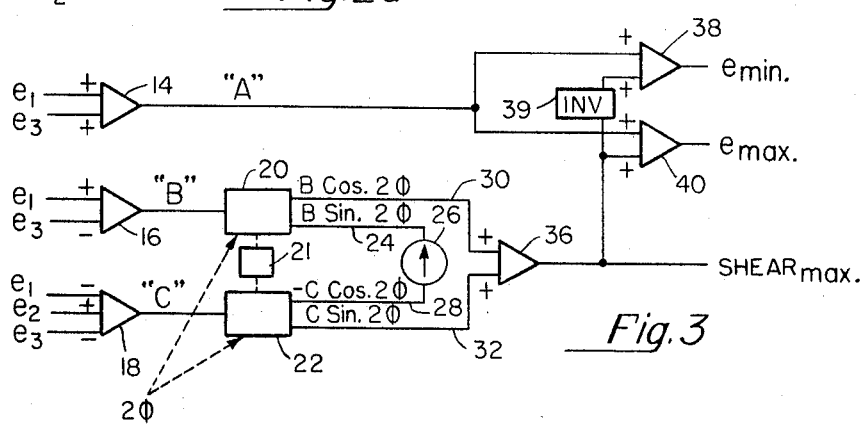
FIG. 3 is a block diagram of an electronic rosette calculator, in accordance with the present invention.

Referring particularly to FIG. 3, electrical signals proportional to the readings from the three strain gages 11, 12 and 13 (FIG. 1) are applied to a plurality of analog amplifiers 14, 16 and 18. The electrical signals representing measurement from the strain gages 11 and 13, taken without change of sign, are applied to an analog amplifier 14 to produce an output combined or additive signal representative of the sum of the two positive signals from the strain gages 11 and 13. This combined signal may be represented by A.

The signals representing the strain gages 11 and 13, with the signal representing the gage 11 taken positively and the signal from the gage 13 being inverted (sign changed) are also applied to a second amplifier 16 to produce an output signal B representing the difference between the electrical signals produced by the strain gages 11 and 13. It is noted that reversal polarities of signals are easily obtained by the use of inverters which are well known to those skilled in the art and hence not illustrated or described in detail.

The signal representing the strain gages 11, 12 and 13 are also applied to an analog amplifier 18 to produce an output signal C. In this latter case, the signals representing the strain gages 11 and 13 are inverted at twice its value and the signal representing the strain gage 12 is taken positively.

The output signals from the amplifier 16 and 18 are applied to a pair of sine-cosine potentiometers 20 and 22, respectively. As indicated, the potentiometer 20 has two output leads 24 and 30 with the lead 30 providing a function equal to $B$ cosine $2\phi$ and the lead 24 representing $B$ sine $2\phi$. In like manner, the potentiometer 22 includes two output leads 28 and 32, with the lead 28 representing the function $-C$ cos $2\phi$ and the lead 32 representing the function $C$ sine $2\phi$.

The lead 24 from the potentiometer 20 is applied to a galvanometer 26. Likewise the lead 28 is applied to the opposite end of the galvanometer 26. The output leads 30 and 32 from the potentiometers 20 and 22, respectively, are connected to an analog amplifier 36 in a positive manner, yielding an output from amplifier 36 of the algebraic sum.

The output signal A from the amplifier 14, is positively applied to a pair of output analog amplifiers 38 and 40. The output signal from the analog amplifier 36 is positively applied to the amplifier 40. The signal from the amplifier 36 is applied to through an inverter 39 to the amplifier 38. The amplifier 38 produces an output signal which represents the difference between the signal A and the output signal from the amplifier 36. As is seen, this output signal is equal to the sum of $C$ sine $2\phi$ plus $B$ cos $2\phi$. The amplifier 40 produces an output signal representing the sum of the signal A and the output signal from the amplifier 36.

It is noted that the potentiometers 20 and 22 may be adjusted either manually by means of knob 21. They may also be controlled automatically by servo controls or the like so that $2\phi$ may be determined. The potentiometers 20 and 22 are adjusted manually or automatically until $B$ sine $2\phi - C$ cos $2\phi = 0$. The galvanometer 26 will indicate this null or zero condition since the signals related to these functions are applied in opposition to the galvanometer.

When the potentiometers 20 and 22 are set properly to indicate a null condition at the galvanometer when the signals from the amplifier 38 represents $e$ min., the output signal from the amplifier 40 represents $e$ max., and the output signal from the amplifier 36 represents maximum shear.

As mentioned, instead of utilizing manual controls to actuate the sine-cosine potentiometers, servo means may be employed. Such means would include servo motors actuated by error signals with feedback paths. Null amplifiers or other devices would be used to detect a null condition as when the error signals in the feedback paths are reduced to zero. Such servo means are well known to those skilled in the art. Because these means are only incidentally related to the subject invention, they are not illustrated or described in detail.

While the present invention has been described thus far in connection with obtaining strain measurements, it may also be used in a substantially similar manner to obtain unknown measurements relating to stress.

The applications of some of the stress equations is illustrated as follows. These equations are in forms so that the present invention, as described, may be used in solving such equations:

Let $R = C \sin 2\phi + B \cos 2\phi$
then $$\sigma \max. = E\frac{1}{1-u^2}[A+R+u(A-R)]$$

$$\sigma \min. = E\frac{1}{1-u^2}[A-R+u(A+R)]$$

$$\tau \max. = E\frac{1}{1+u}2R$$

$$\sigma \max. = E\left(\frac{A}{1-u}+\frac{R}{1+u}\right)$$

$$\sigma \min. = E\left(\frac{A}{1-u}-\frac{R}{1+u}\right)$$

$$\tau \max. = 2E\left(\frac{R}{1+u}\right)$$

Including the expression for R and regrouping, $$\sigma \max. = E\frac{A}{1-u}+\left(\frac{C}{1+u}\sin 2\phi+\frac{B}{1+u}\cos 2\phi\right)$$

$$\sigma \min. = E\frac{A}{1-u}-\left(\frac{C}{1+u}\sin 2\phi+\frac{B}{1+u}\cos 2\phi\right)$$

$$\tau \max. = 2E\left(\frac{C}{1+u}\sin 2\phi+\frac{B}{1+u}\cos 2\phi\right)$$

In the above, $\sigma$ represents linear stress and $\tau$ represents shear stress.

It will be noted that the last three equations from this group are identical to the group derived for strain except for the inclusion of the variable scaling factor for elasticity and the fact that the quantities A, B and C now have a linear divisor as a function of Poisson's ratio ($u$). Operational amplifiers of conventional design are capable of handling the inclusion of these functions so that the basic strain measurements may be used to attain stress measurements.

Sine-cosine potentiometers of the type described are well known to those skilled in the art. One such type is described on page 498 of "Pulse & Digital Circuits" by Millman & Taub, published by McGraw-Hill Book Co., Inc. and copyrighted in 1956.

Analog computing devices for adding, subtracting, multiplying and the like are also well known to those skilled in the art. The use of feedback arrangements to control the gain of amplifiers and to obtain certain desired operations is also well known. Such devices are disclosed in "McGraw-Hill Encyclopedia of Science & Technology" in vol. 1, pages 368 et seq., published by McGraw-Hill Book Co., Inc. and copyrighted in 1960.

In practice, the shafts of the sine-cosine potentiometers may be associated with a graduated dial to obtain information relating to the angles involved. When the galvanometer shows no deflection, the various output signals are presented as voltages. The magnitude and signs of these voltages can be determined by various techniques. An extension of this technique may also be used to solve stress equations.

Figure 4:
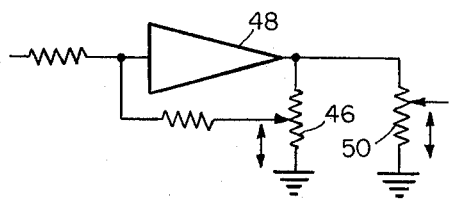
FIG. 4 is a schematic diagram, partly in block diagram form, illustrating an operational amplifier which may be used in practising one form of the present invention.

FIG. 4 illustrates a simplified operational amplifier illustrating the manner in which the gains of the amplifier may be varied or controlled in accordance with Poisson's Ratio and the elasticity factor of the element under test. The potentiometer 46 in the input circuit of the amplifier 48 may be varied linearly with the quantity $(1+u)$ or $(1-u)$. The potentiometer 50 may be varied to introduce the elastcity factor in the amplifiers. Thus the amplifiers illustrated in FIG. 3 may be modified to provide control potentiometers and feedback paths to obtain stress readings.

It is recognized that if the angularly dispositions of the strain gages in FIG. 1 are different than that illustrated then changes would be required in the manner in which the inputs of amplifiers 14, 16, and 18 are handled. The balance of the circuit would remain unchanged.

Various switching devices for including or excluding portions of circuitry dependent upon whether strains or stresses are to be measured may be employed in practicing the present invention.

The calculator discussed may take a number of different forms. In one form of the invention, information relating to the strain gages may be recorded or obtained at one location in the field. This information may be later converted to numerical values and appropriately processed in the manner described. In another form of the invention the strain gages may be actually connected to the calculator which processes the information derived from the gages.

While the term amplifiers have been used, it is apparent that such amplifiers are not limited to devices which amplify signals but also include other devices which merely buff or combine input signals without any amplification.

It has thus been seen that the present invention has made it possible to produce a small, compact, efficient rosette calculator which requires little skill in operation and which does not involve the solutions of complex equations.

What is claimed is:

1. A rosette calculator for receiving measured data relating to a plurality of strain gages angularly disposed on a surface of an element under test and for converting said measured data into information data relating to stress or strain measurements, comprising:
   means for selectively combining said measured data to produce combined output signals;
   means for varying selected ones of said combined output signals to produce output variable signals, said means for varying including a pair of sine cosine potentiometers each having two output signals indicative of the sine and cosine functions of the combined signals applied to said potentiometers;
   means for detecting the amplitudes of selected ones of said variable signals to detect a predetermined relationship therebetween;
   a utilization circuit; and
   means for applying said variable signals to said utilization circuitry to generate signals representing said information data when said predetermined relationship between said variable signals is detected.

2. The invention as set forth in claim 1 wherein said strain gages are electrically connected to said rosette calculator.

3. The invention as set forth in claim 1 wherein said pair of potentiometers are actuated by servo means.

4. The invention as set forth in claim 1 wherein said means for detecting comprises a galvanometer.

5. The invention as set forth in claim 3 wherein said means for detecting comprises a device for detecting a null signal in a feedback path included in said servo means.

6. The invention as set forth in claim 1 wherein the selected ones of said variable signals detected by said galvanometer includes a variable signal representing a sine function from one of said potentiometer and a variable signal representing a cosine function from the other of said pair of potentiometers.

7. The invention as set forth in claim 6 wherein said means for selectively combining include analog amplfiers.

8. The invention as set forth in claim 7 wherein at least first, second and third analog amplifiers are provided with the output signals from said second and third analog amplifiers being applied to said pair of sine-cosine potentiometers.

9. The invention as set forth in claim 8 wherein other selected ones of said variable signals representative of sine and cosine functions are applied from said pair of potentiometers to a fourth analog amplifier.

10. The invention as set forth in claim 9 wherein fifth and sixth analog amplifiers are provided, with signals from said first and fourth amplifiers are applied to said fifth amplifier and an inverted signal from said fourth amplifier with the signal from said first amplifier being applied to said sixth amplifier.

11. The invention as set forth in claim 10 wherein said fourth, fifth and sixth amplifiers comprise said utilization circuit for generating signals representing, said information data relating to strain and stress measurements.

12. The invention as set forth in claim 11 wherein the gains of some of said amplifiers are varied in accordance with Poisson's ratio and the elasticity factor of said element under test.

13. The invention as set forth in claim 11 wherein said output signals at said utilization circuit represent maximum strain, minimum strain and maximum shear of said element under test.

14. The invention as set forth in claim 11 wherein said output signals at said utilization circuit further includes means for developing signals representing maximum stress, minimum stress and maximum shear of said element under test.

15. The invention as set forth in claim 14 wherein switching means are provided to selectively produce output signals at said utilization circuit representing strain or stress measurements.

16. A rosette calculator for receiving measured data relating to a plurality of strain gages angularly disposed on a surface of an element under test and for converting said measured data into information data relating to stress or strain measurements, comprising:

means for selectively combining said measured data to produce combined output signals;

means for varying in accordance with trigonometric functions selected ones of said combined output signals to produce output variable signals indicative of the sine and cosine functions thereof;

means for detecting the amplitude of selected ones of said variable signals to detect a predetermined relationship therebetween;

a utilization circuit; and means for applying said variable signals to said utilization circuit thereby generating signals representing said information data when said predetermined relationship between said variable signals is detected.

17. The invention as defined in claim 16 wherein said strain gages are electrically connected to said rosette calculator.

References Cited

UNITED STATES PATENTS

| 2,755,020 | 7/1956 | Belcher | 235—151.3 |
| 3,166,135 | 1/1965 | Clamp | 73—88.5 X |
| 3,197,697 | 7/1965 | McCauley | 73—88.5 X |

OTHER REFERENCES

Meier et al., "Electronic Computing Apparatus for Rectangular and Equiangular Strain Rosettes," Experimental Stress Analysis, vol. II No. 1, 1944. pp. 78–101.

Hoskins et al., "An Electrical Computer for the Evaluation of Strain-Rosette Data," Experimental Stress Analysis, vol. II No. 1, 1944. pp. 67–77.

MALCOLM A. MORRISON, Primary Examiner

ROBERT W. WEIG, Assistant Examiner

U.S. Cl. X.R.

73—88.5; 235—186

Dedication 3,474,237.—*Joseph C. Hastings,* Haverford, Pa. STRAIN GAGE ROSETTE CALCULATOR. Patent dated Oct. 21, 1969. Dedication filed July 8, 1982, by the assignee, *Vishay Intertechnology, Inc.*

Hereby dedicates the remaining term of said patent to the Public.

[*Official Gazette November 16, 1982.*]